United States Patent
Wahler

(10) Patent No.: US 6,880,760 B2
(45) Date of Patent: Apr. 19, 2005

(54) DRIVE ARRANGEMENT FOR A CARD HOLDER

(75) Inventor: Torsten Wahler, Bad Duerrheim (DE)

(73) Assignee: Siemens Aktiengesellschaft, München (DE)

( * ) Notice: Subject to any disclaimer, the term of this patent is extended or adjusted under 35 U.S.C. 154(b) by 0 days.

(21) Appl. No.: 10/859,109

(22) Filed: Jun. 3, 2004

(65) Prior Publication Data

US 2004/0217176 A1 Nov. 4, 2004

Related U.S. Application Data

(63) Continuation of application No. PCT/DE02/03854, filed on Oct. 11, 2002.

(30) Foreign Application Priority Data

Dec. 7, 2001 (DE) .......................................... 101 60 276

(51) Int. Cl.⁷ .............................................. G06K 13/08
(52) U.S. Cl. ....................................................... 235/480
(58) Field of Search .......................................... 235/480

(56) References Cited

U.S. PATENT DOCUMENTS

| | | | | |
|---|---|---|---|---|
| 4,709,136 A | * | 11/1987 | Watanabe | 235/379 |
| 4,711,993 A | * | 12/1987 | Kosednar et al. | 235/380 |
| 4,900,904 A | * | 2/1990 | Wright et al. | 235/381 |
| 5,528,021 A | * | 6/1996 | Lassus et al. | 235/380 |
| 5,913,400 A | * | 6/1999 | Farmont | 194/210 |
| 5,979,773 A | * | 11/1999 | Findley et al. | 235/492 |

FOREIGN PATENT DOCUMENTS

| | | |
|---|---|---|
| DE | 3309289 A1 | 9/1984 |
| DE | 3707449 A1 | 9/1988 |
| DE | G8906634.0 | 8/1989 |
| DE | 4131762 A1 | 4/1993 |
| DE | 4118500 C2 | 7/1994 |
| DE | 4426879 C2 | 9/1996 |
| DE | 19638286 A1 | 4/1998 |
| DE | 20015100 U1 | 1/2001 |
| EP | 0311119 A1 | 4/1989 |

OTHER PUBLICATIONS

Derwent Abstact –DE20015100U1; Jan 25, 2001; Mannesmann VDO AG, D–60388 Frnakfurt.
Derwent Abstract –DE–4131762A1; Apr. 1, 1993; Aug. Winkhaus GmbH & Co.KG, D–4404 Telgte.
Derwent Abstract –DE–3707449A1; Sep. 15, 1988; Bernd Mitschinski, D–6369 Nidderau.
Derwent Abstract –DE–4426879C2; Sep. 5, 1996; Mercedes–Benz Aktiengesellschaft, D–70327 Stuttgart.
Derwent Abstract –DE–4118500C2; Jul. 21, 1994; Dipl.–Ing.Joachim Griepentrog, D–51465 Bergisch Gladbach.
Derwent Abstract –DE–19638286A1; Apr. 2, 1998; Farmont Technik GmbH & Co. KG, D–40217 Düsseldorf.
Derwent Abstract –DE–3309289A1; Sep. 27, 1984; Hülsbeck & Fürst GmbH 7 KG, D–5620 Velbert.

* cited by examiner

*Primary Examiner*—Mark Tremblay
(74) *Attorney, Agent, or Firm*—Jacob Eisenberg; Siemens AG

(57) ABSTRACT

The present invention relates to a compact drive system serving to deflect a push force to move a carriage assigned to the chip card and mounted in a chip card receiving unit. A flexible, pressure-transmitting force conductor is provided in the form of individual spheres, the force conductor being assigned a direction-deflecting guide and a push rod provided with an actuating member. The force conductor is driven by a control slide engaging in the duct, the control slide being connected by a gear to a positioning motor.

12 Claims, 3 Drawing Sheets

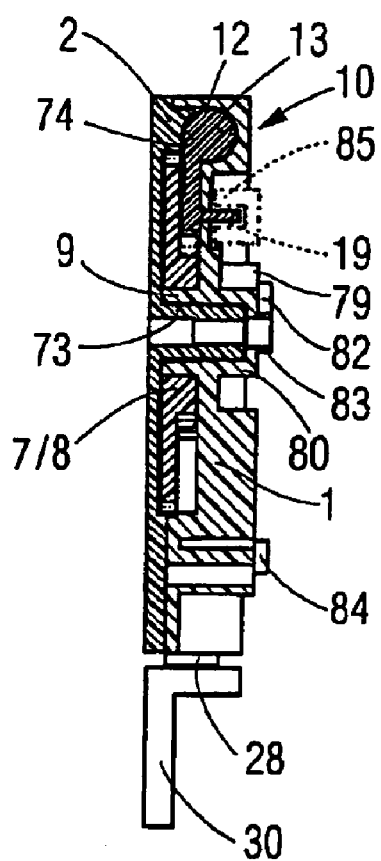
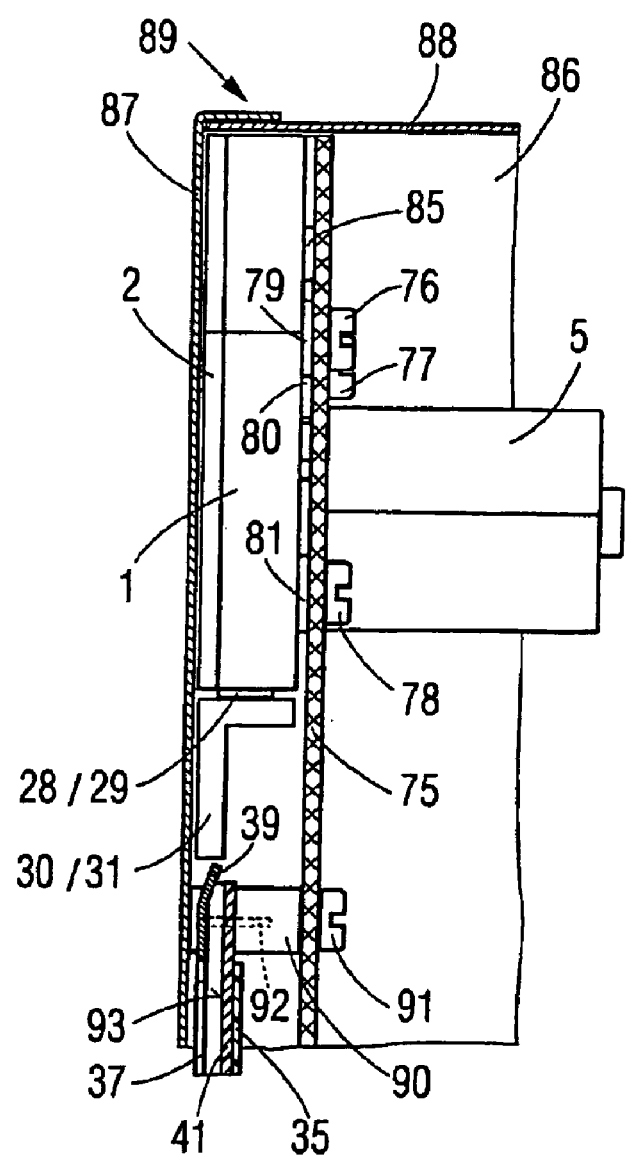

DRIVE ARRANGEMENT FOR A CARD HOLDER

CROSS REFERENCE TO RELATED APPLICATIONS

The present invention is a continuation of international application PCT/DE02/03854, filed Oct. 11, 2002, which designated the United States, and further claims priority to German application 10160276.6, filed Dec. 7, 2001, the both of which are herein incorporated by reference.

BACKGROUND OF THE INVENTION

The present invention relates to a drive arrangement for at least one smart card holder, the holder being arranged in a tachograph. The drive arrangement is arranged so as to move a smart card to the removal position, and includes: a reversible actuating motor, a control slide which is operatively connected by a transmission to the actuating motor, and transmission means which are provided between the control slide and the smart card holder.

Tachographs of this generic type are generally designed as built-in units with a flat, cuboid built-in housing. There is therefore very little physical space available from the start for a smart card holder and its drive means. This results in a smart card which is located in the read/write position being moved to the removal position. On the other hand, smart cards which have been deformed during their use, for example by being curved or rippled, particularly when they have been inserted into the read/write position exclusively by hand, with the necessary amount of force being applied, result in a considerable amount of force being required in order to allow them to be transported to the removal position again. This force requirement must be applied and transmitted by the drive means, thus necessitating a robust design and hence sufficient physical space. Furthermore, on the one hand owing to the small physical height required by the tachograph and on the other hand owing to the need to make contact, it is also expedient to associate the smart card holder and the drive means directly with the printed circuit board of the tachograph. However, even though it is designed to largely fill the format of the outline of the tachograph housing, there is a considerable lack of space available on the printed circuit board owing to the high component density, so that an arrangement of the smart card holder and of its drive means that is still possible generally necessitates a change in the direction of the thrust force which is exerted by the control slide. This is particularly true in the case of a tachograph which is equipped for simultaneous recording of at least the work and rest times of the driver and co-driver, and in which two smart card holders are provided and in the end, furthermore, only a single actuating motor must be provided, for cost reasons, by means of which the smart card for the driver or that for the co-driver must be transported to the respective removal position with the interposition of transmission means which change the direction of the force flow.

A drive arrangement which is known in this context from German Utility Model 200 15 100.2 envisages belt-driven means between a control slide, which is driven by an actuating motor, and the carriages which are mounted in the relevant smart card holders and are associated with the smart cards, in order to change the direction of the movement of the control slide to the direction for emitting the smart cards. Owing to the high friction losses resulting from transverse forces and the system-dependent force distribution, such transmission means necessitate an increase in the power of the actuating motor and, owing to the necessary guidance accuracy of the components on which the belt-drive elements are formed, result in a very high degree of manufacturing effort, and occupy considerable physical space.

SUMMARY OF THE INVENTION

The object of the present invention is thus to provide a drive arrangement of this generic type which offers optimum use of the available power from the actuating motor with a high degree of functional reliability using components which can be produced and installed in a mass production environment, and which can be implemented with as little space requirement as possible.

The stated object is achieved in that a flexible, force-transmitting force conductor is used as the transmission means, and in that the force conductor has an associated direction-changing guide.

One preferred exemplary embodiment is characterized in that individual pressure elements which are guided in a channel such that they can move freely are provided as force conductors, and in that balls are provided as pressure elements.

One advantageous exemplary embodiment consists in that the force conductor and the control slide are in the form of a single component which can be produced by injection molding, in which case the force conductor comprises a strand, which is produced from elastomer material and has sliding bodies which are integrally formed on it and are composed of non-elastomer material.

Further embodiment variants and expedient refinements of the invention are described in the dependent claims that are not cited, or will become evident from the description of the drawings.

The major advantage offered by the invention is that a modular drive arrangement can be formed, which comprises the control slide, the step-down transmission which drives the control slide, and the transmission means, for which modular drive arrangement the preferred exemplary embodiment provides a housing which can be closed by a cover. This assembly in which only the actuating motor which is arranged on the opposite side of the printed circuit board of the tachograph engages by means of a pinion that is mounted on the motor shaft, occupies little space and can be varied in a simple manner. One major factor is that the drive arrangement can be produced by technically simple, robust means which can be installed easily, and offers satisfactory functional reliability with a high efficiency. The solution that has been found is also insensitive to tolerances and, owing to the largely direct action of the control slide on the smart card holder and on a carriage which is associated with the smart cards and is mounted in the smart card holder so that it can move, requires only a short operating time for moving a smart card from the read/write position to the removal position even when using a relatively low power actuating motor.

It is also worth mentioning that the control slide need not necessarily be guided at right angles to the movement directions of a smart card. The direction of the force flow can be changed as required via the flexible force conductors that are provided. Furthermore, when using two smart card holders which are arranged alongside one another, it is also irrelevant whether they are arranged close to one another or relatively far apart from one another. In any case, the solution according to the invention can also be used when the smart card holders are arranged at the greatest possible distance apart form one another in the relevant tachograph.

Furthermore, when individual elements which are not connected to one another, for example balls, are used as a force conductor, an asymmetric arrangement of the control slide with respect to the smart card holders is possible without any additional component complexity. The push rods which are advantageously held in the guides associated with the force conductors at the same time represent locking elements, which can be held in a sprung manner against the housing of the drive arrangement. The push rods and the operating elements which are integrally formed on the push rods also have an adapter function, that is to say they may be designed for operation of smart card holders of different configuration. However, it is also feasible to dispense with the push rods and to form projections, which engage in the guides for the force conductors, on the carriages which are associated with the smart cards.

For the sake of completeness, it should also be mentioned that the chosen transmission principle can operate in three dimensions, so that the control slide may also be arranged away from the movement plane of the smart cards. It should also be mentioned that, apart from individual, preferably commercially available, steel balls, ball chains, chains composed of spherical or barrel-shaped chain links which can be coupled to one another or flexible strands which are produced integrally and have spherical sections may also be used as the force conductors. In the same way, force conductors composed of spring steel, are guided in the housing of the drive arrangement and are in the form of strips or wires may likewise be provided in some suitable manner. It is also possible to use as force conductors T-shaped pressure elements which are guided in a groove that is formed in the housing and are held in the grove by means of the cover and which are connected to one another in a flexible manner, for example by means of integrally formed loops.

BRIEF DESCRIPTION OF THE SEVERAL VIEWS OF THE DRAWINGS

The invention will be explained in the following text with reference to drawings, in which:

FIG. 4 shows a section through the drive arrangement along the section line A in FIG. 1, FIG. 5 shows a partial section through the tachograph with a side view of the drive arrangement installed in the tachograph, as well as a partial section along the section line B in FIG. 1.

DETAILED DESCRIPTION OF THE INVENTION

Figure 1:
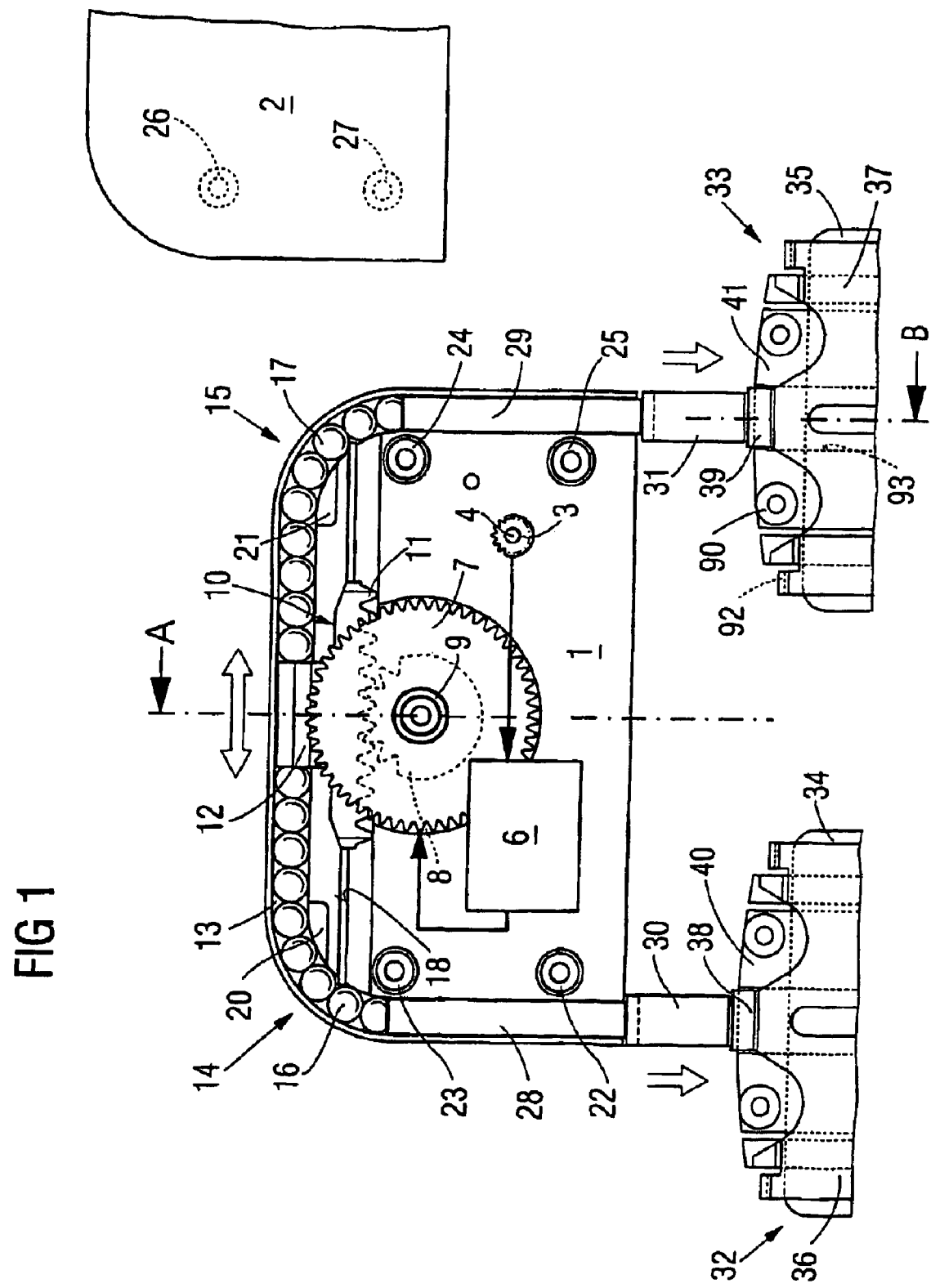
FIG. 1 shows a view from underneath of the drive arrangement according to the invention, illustrated partially schematically, with a partial illustration of the removed cover and an illustration of the association between the drive arrangement and the smart card holders in a tachograph.

As can be seen from FIG. 1, the functional elements of the drive arrangement are essentially mounted in a housing 1 which can be closed by means of a cover 2. 3 denotes a drive pinion, which is mounted on the motor shaft 4 of an actuating motor 5 (FIG. 5) which engages in the housing 1. A schematically illustrated step-down transmission 6, downstream from the drive pinion 3, is operatively connected to a pair of gearwheels 7, 8, which are mounted on a hollow shaft 9. The gearwheel 8 engages with a toothed system 11 which is formed on a control slide 10. The control slide 10 is mounted in the housing 1 such that it can move, and has a finger 12 which engages in a channel 13, which is intended for bearing two or more freely moving balls which are used as flexible, pressure-transmitting force conductors 14 and 15 and are respectively annotated 16 and 17. This solution allows large actuating forces to be transmitted with relatively little friction. In addition to the pair of gearwheels 7, 8, the control slide 10 is also guided by a guide tongue 19 (FIG. 4) which engages in a slot 18 that is formed in the housing 1. End stops, which are formed in the housing 1 and are associated with the control slide 10, are annotated 20 and 21. Hollow pins 22, 23, 24 and 25, which are provided with holes through them that are not annotated any further are used to hold the cover 2 in that spacer bolts which are integrally formed on the cover 2 and that two of which 26 and 27, are shown in FIG. 1 engage in recesses, which are not annotated, in the hollow pins 22, 23, 24, 25. The push rods which are guided in the channel 13 are annotated 28 and 29, and their operating elements 30 and 31 are designed in a suitable manner for interaction with smart card holders 32 and 33, which are indicated in FIG. 1, for the relevant tachograph.

In the functional state illustrated in FIG. 1, the drive arrangement is in a neutral position from which either one or the other smart card 34 or 35 can be moved to its removal position. For this purpose, the operating elements 30 and 31 of the push rods 28, 29 interact with carriages 36 and 37 with which the smart cards 34, 35 are fitted, and with tongues 38 and 39 which are formed on the carriages 36, 37. The carriages 36, 37 are mounted in suitable manner such that they can move on mounts 40 and 41 of the smart card holders 32, 33. If necessary, the carriages 36, 37 have associated locking means.

Figure 2:
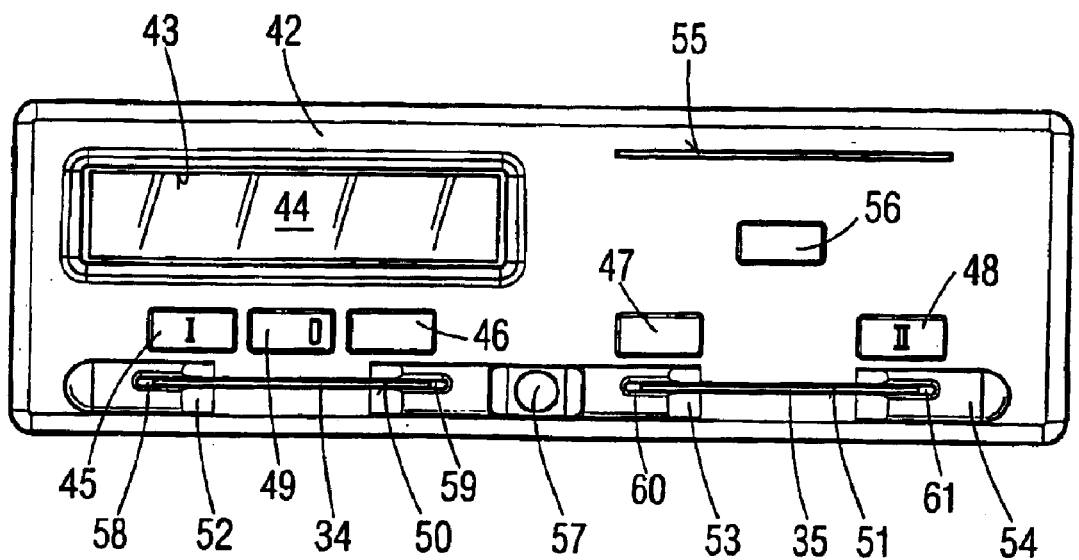
FIG. 2 shows a front view of the tachograph, which serves for orientation purposes, with smart card holders which are arranged alongside one another on one plane.

FIG. 2 is intended to explain how the smart card holders 32, 33 are arranged in a tachograph which, for example, has a cuboid housing. FIG. 2 shows a front panel 42 which covers the built-in housing part of the tachograph. A window cutout is annotated 43, through which the indication of a display 44 is legible. In addition, a number of keys 45, 46, 47 and 48 are passed out of the front panel 42. In this case, the keys 45 and 48 are used for registration by the driver and co-driver, the keys 6 and 7 are used in connection with the keys 45 and 48 in order, inter alia, to release the respective personal smart cards 34, 35 associated with the driver and co-driver. A plug socket, which is used for diagnosis purposes, is closed by a cover 49. Guide slots 50 and 51 which are fitted in the front panel 42 and some of which are recessed in the form of funnels are used for initial orientation during insertion of the smart cards 34, 35 by the driver and co-driver into the respective smart card holders 32, 33 (which are located in the built-in housing part) of the tachograph. Cutouts 52 and 53 in the projection 54 (which is in the form of a bead) on the front panel 42 are used as input troughs for initial insertion of the smart cards 34, 35 into the respective read/write positions. A slot which is annotated 55 is provided for the print medium of a receipt printer that is arranged in the tachograph to pass through. A key 56 is used to start printing. A lead seal is annotated 57, securing a screw connection between the front panel 42 and the built-in housing part. FIG. 2 also shows bolt elements 58, 59 and 60, 61 which are pivoted in front of the smart cards 34, 35 and are mounted in the smart card holders 32, 33.

Figure 3:
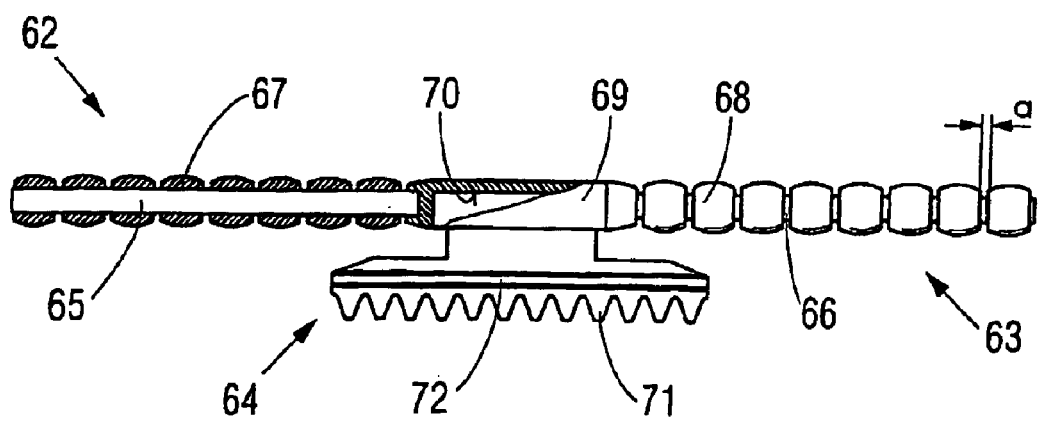
FIG. 3 shows a plan view of a component which comprises two force conductors and a control slide.

FIG. 3 shows a solution which is optimized for mass production, in which force conductors 62 and 63 which are associated with the smart card holders 32, 33, and a control slide 64, form a single component which can be formed by injection molding. In this case, each force conductor 62, 63 comprises a respective strand 65, 66, which is manufactured from elastomer material, and barrel-shaped sliding bodies, which are integrally formed on them by means of the two-component injecting-molding technique and are composed of non-elastomer material. The sliding bodies which are integrally formed at a specific distance "a" from one another on the strands 65, 66 are respectively annotated 67 and 68. As FIG. 3 also shows, the force conductors 62, 63 are connected via the strands 65, 66 directly to the finger 69 (which engages in the channel 13) of the control slide 64, which is expediently formed from the same material as the slide bodies 67, 68. A cutout (which is annotated 70) is used to avoid accumulation of material on the finger 69. Otherwise, the control slide 64 is in the same form as the control slide 10, that is to say it is provided with a toothed system 71 and with a guide tongue 72. At this point, it should also be mentioned that, for molding reasons, the sliding bodies 67, 68 are axially slotted in order to form the force conductors 62, 63, and the cross-sections of the connecting strands 65, 66 can be designed to correspond to the profile of the slots.

The section shown in FIG. 4 illustrates in particular how the housing 1 and the cover 2 are joined together once the functional parts of the drive arrangement have been inserted into the housing 1. A centering pin 73, which is formed on the cover 2 and engages in the hollow shaft 9, as well as an anti-rotation device, which is not illustrated but is expediently provided in the area of the bushing for the motor shaft 4, are used to align the cover 2 on the housing 1. A groove which is formed on the cover 2 and is supplementary to the channel 13 is annotated 74. The cover 2 is attached to the housing 1 by mounting the drive arrangement on the already mentioned printed circuit board 75 in the tachograph. This is done by means of a number of screw connections, of which three screws 76, 77 and 78 can be seen in FIG. 5. Threaded holes, which are not shown in detail, are associated with the screws 76, 77, 78 in the spacer bolts 26, 27 and in the pin 73, and these screws engage in the hollow pins 22, 23, 24, 25 and in the hollow shaft 9. This means that the housing 1 is attached indirectly to the printed circuit board 75 via the cover 2. Supports 79, 80 and 81 which are provided with through-holes, are formed on the housing 1 and have attachments 82, 83 and 84 (which are integrally formed on them and are used for alignment of the drive arrangement on the printed circuit board 75) are used as a rest. One of two forked light barriers which are fitted to the printed circuit board 75 is annotated 85, and these are used in conjunction with the guide tongue 19 on the control slide 10 for controlling the actuating motor 5. This means that, depending on the selected rotation direction of the actuating motor 5, either the push rod 28 or the push rod 29 is operated in the direction of emitting a smart card 34, 35, starting from the neutral position as illustrated in FIG. 1, by means of the control slide 10 and the force conductors 14, 15, and the control slide 10 is then moved back to the neutral position in order to ensure that another smart card can be inserted. In this context, it should be mentioned that pin/slot connections are provided between each of the push rods 28, 29 and the housing 1, are used as anti-rotation devices and allow the drive arrangement to be handled without any problems before it is installed in a tachograph.

FIG. 5, which shows sections of a side wall 86, of the base 87 and of the rear wall 88 of the built-in housing part 89 of the tachograph, illustrates the small amount of space required for the drive arrangement according to the invention, particularly with regard to the physical height and physical depth. FIG. 5 also shows the association between the smart card holders 32, 33 and the printed circuit board 75, in the partial section B. Spacing bolts 90, which are in the form of spacers from the base 87, are provided with threaded holes and are integrally formed on the mounts 40, 41, and screws 91 are used for this purpose. A driver which is integrally formed on the carriage 36, 37 and is associated with the smart cards 34, 35 is annotated 92. A cutout which is provided in the mounts 40, 41 is annotated 93, and forms the free space for the movement of the tongues 38, 39, which are formed at an angle on the carriages 36, 37 and for the entry of the operating elements 30, 31.

I claim:

1. A drive arrangement for at least one smart card holder comprising:
   means for moving a smart card to the removal position,
   a reversible actuating motor,
   a control slide operatively connected to the motor by a transmission, and
   transmission means arranged between the control slide and the smart card holder, the transmission means comprising a flexible, force-transmitting force conductor having an associated direction-changing guide.

2. The drive arrangement according to claim 1, wherein the force conductor comprises an individual pressure element guided in a channel so as to move freely.

3. The drive arrangement according to claim 1, wherein the force conductor comprises a plurality of force conductors comprising individual pressure elements combined in a chain.

4. The drive arrangement according to claim 1, further comprising pressure elements, the pressure elements comprising balls.

5. The drive arrangement according to claim 1, further comprising an operating element arranged to engage the smart card holder, the operating element moveably mounted in the guide.

6. The drive arrangement according to claim 1, further comprising pressure elements connectable to one another in an articulated manner.

7. The drive arrangement according to claim 1, wherein the force conductor comprises a single pressure element which can be elastically deformed.

8. The drive arrangement according to claim 7, wherein the pressure element comprises one of a strip or wire.

9. The drive arrangement according to claim 7, wherein the pressure element comprises a strand comprising elastomer material and sliding bodies integrally formed on it by injection molding, the bodies comprising non-elastomer material.

10. The drive arrangement according to claim 9, wherein the force conductor and the control slide are a single component formed by injection molding.

11. The drive arrangement as claimed in claim 1, wherein when two smart card holders are arranged alongside one another, the control slide comprises two essentially identical associated force conductors.

12. The drive arrangement as claimed in claim 1, further comprising a guide associated with the force conductors and formed essentially in a housing which bears at least the control slide and the transmission which drives it.

* * * * *